(12) United States Patent
Bergevin

(10) Patent No.: US 6,346,131 B1
(45) Date of Patent: Feb. 12, 2002

(54) FERTILIZER COMPOSITIONS FOR ADMINISTERING PHOSPHATES TO PLANTS

(76) Inventor: David W. Bergevin, 306 N. Montana Ct., Kennewick, WA (US) 99336

( * ) Notice: Subject to any disclaimer, the term of this patent is extended or adjusted under 35 U.S.C. 154(b) by 0 days.

(21) Appl. No.: 09/434,353

(22) Filed: Nov. 3, 1999

(51) Int. Cl.$^7$ .................................................. C05B 7/00
(52) U.S. Cl. .................................... 71/32; 71/33; 71/40
(58) Field of Search ................................ 71/32, 33, 40

(56) References Cited

U.S. PATENT DOCUMENTS

| | | | | |
|---|---|---|---|---|
| 3,649,175 A | * | 3/1972 | Legal, Jr. ..................... | 23/107 |
| 3,798,020 A | * | 3/1974 | Parham, Jr. et al. ............. | 71/1 |
| 3,909,228 A | * | 9/1975 | Nakashima et al. ............. | 71/1 |
| 3,918,952 A | * | 11/1975 | Neumiller ...................... | 71/28 |
| 4,336,052 A | * | 6/1982 | Chen et al. ..................... | 71/28 |
| 4,588,431 A | | 5/1986 | Nakamura ...................... | 71/24 |
| 5,372,626 A | | 12/1994 | Zivion ........................... | 71/11 |
| 5,514,200 A | * | 5/1996 | Lovatt ............................ | 71/11 |
| 5,634,959 A | * | 6/1997 | Beaty ............................ | 71/16 |

* cited by examiner

Primary Examiner—Chhaya D. Sayala
(74) Attorney, Agent, or Firm—Liebler Ivey & Connor; Floyd E. Ivey

(57) ABSTRACT

A plant fertilizer composition that includes an acid whereby said acid may react with, chelate, or block any metal ions in the soil in which the plants grow during administration of the fertilizer. This reaction renders the metal ions substantially ineffective for reacting with the fertilizer components. The fertilizer is thereby shielded from interference with any metal ions in the soil and the delivery of the fertilizer to the plant roots is thereby enhanced. The acid may be, but is not limited to, an organic acid and is preferably citric acid. The fertilizer composition may include phosphorus. Likes in one embodiment, the fertilizer composition may include phosphate ions and citric acid, the citric acid chelating any metal ions in the soil in which the plants grow thereby facilitating the transportation of phosphate to the plant roots. The invention further discloses a method for providing a fertilizer to plant roots, comprising the steps of administering to the soil in which the plants grow, a plant soil fertilizer composition; and shielding the fertilizer from interference with any metal ions in the soil in which the plan grow during said administration of the fertilizer to the plant roots, thereby enhancing delivery of the fertilizer to the plant roots.

23 Claims, No Drawings

FERTILIZER COMPOSITIONS FOR ADMINISTERING PHOSPHATES TO PLANTS

FIELD OF THE INVENTION

The present invention relates generally to fertilizer compositions and a method for administering the same. In particular the invention relates to phosphate fertilizer compositions including citric acid and a method of providing phosphates to plants.

BACKGROUND OF THE INVENTION

Phosphate is an essential element in plant growth and is common in soil. Phosphates are classified by the percentage of phosphate that is soluble in water and citrate. The sum of the water-soluble and citrate-soluble phosphates (hereinafter referred to as soluble phosphates) is the amount available to plant roots.

Soils contain soluble and insoluble phosphates. By far the vast majority of phosphate compounds in soil are insoluble, normally in the form of brushites. Soluble phosphates may react with natural cations in the soil such as $Ca^{+1}$ or $Ca^{+2}$. Such phosphates become brushites and other insoluble crystalline compounds. Such insoluble phosphates are not available to plant roots. Soluble phosphates can be bio-organic complexes or simple soluble salts called orthophosphates, i.e., salts containing $PO_4^{-3}$, $HPO_4^{-2}$, or $H_2PO_4^{-1}$. The bio-organic complexes are produced from plant and animal wastes and degradation.

Fertilizers utilize orthophosphates and polyphosphates (chains of orthophosphates). However, not all of the orthophosphate is available to the plant roots. When the orthophosphate comes in contact with a strong cation in the soil, an insoluble crystal is formed such as a brushite or monetite. This problem is overcome by saturating the cation rich soil with soluble phosphates. Over saturation of orthophosphates in the soil ties up the inhibiting cations, which then allows some soluble phosphates to travel from the surface of the soil to the plant roots. However, this practice is wasteful and not environmentally sound. The excess phosphates can run off into waterways where the results can be devastating.

Chelating agents have recently been used to chelate and transport metal ions to plant roots. U.S. Pat. No. 5,372,626 discloses a method for providing metal ions consisting of $Fe^{+3}$, $Mn^{+2,}$ $Cu^{+2}$, and $Zn^{+2}$ to plant roots by using citric acid to chelate the metal ions for transport through the soil. The use of humic acid as a chelating agent to produce a fertilizer containing stabilized predetermined levels of water-soluble and citric-acid soluble phosphoric contents is disclosed in U.S. Pat. No. 4,588,431.

The patents referred to herein are provided herewith in an Information Disclosure Statement in accordance with 37 CFR 1.97.

SUMMARY OF THE INVENTION

The present invention disclosed herein includes a plant fertilizer composition that includes an acid acting as a steric transport vehicle (STV) that may react with, chelate, or block any metal ions in the soil in which the plants grow during administration of the fertilizer. This reaction renders the metal ions substantially ineffective for reacting with the fertilizer components. The fertilizer is thereby shielded from interference with any metal ions in the soil and the delivery of the fertilizer to the plant roots is thereby enhanced.

The acid may be, but is not limited to, an organic acid and preferably citric acid.

The fertilizer composition may include phosphorus. This means that the fertilizer may include any phosphorus containing compound, acid, or salt thereof. Likewise, in one embodiment, the fertilizer composition may include phosphate ions and citric acid, the citric acid chelating any metal ions in the soil in which the plants grow thereby facilitating the transportation of phosphate to the plant roots.

In an alternative embodiment, the fertilizer composition may comprise metal ions, said acid reacting with said any metal ions in said soil in which the plants grow, thereby inhibiting any interference from said any metal ions in said soil in which the plants grow and enhancing delivery of the fertilizer metal ions to the plant roots.

The invention further discloses a method for providing a fertilizer to plants, comprising the steps of administering to the plants a fertilizer composition; and shielding the fertilizer from interference with any compounds including metal ions during said administration of the fertilizer to the plant thereby enhancing delivery of the fertilizer to the plants.

In one embodiment, the method comprises the steps of administering to the soil in which the plants grow, a plant soil fertilizer composition; and shielding the fertilizer from interference with any metal ions in the soil in which the plants grow during said administration of the fertilizer to the plant roots, thereby enhancing delivery of the fertilizer to the plant roots.

In an alternative embodiment of the method, the fertilizer composition may be foliarly applied, the steric transport vehicle reacting with or loosening up the foliar biochemical constituents to thereby facilitate the uptake of the fertilizer.

DETAILED DESCRIPTION

The present invention disclosed herein includes a plant fertilizer composition that includes an acid, acting as a steric transport vehicle (STV), whereby said acid may react with, chelate, or block any metal ions in the soil in which the plants grow during administration of the fertilizer. This reaction renders the metal ions substantially ineffective for reacting with the fertilizer components. The fertilizer is thereby shielded from interference with any metal ions in the soil and the delivery of the fertilizer to the plant roots is thereby enhanced.

The acid may be an organic acid. The organic acid may be, but is not limited to, an aliphatic acid, or an acid containing at least one carboxyl group. The organic acid is preferably citric acid.

Likewise, the acid may be, but is not limited to, phosphoric acid, phosphorous acid, an acid with a molecular weight of not more than 400, a phosphorus-containing acid with a molecular weight of not more than 300, a sulfur-containing acid, oxalic acid, and acetic acid. The sulfur-containing acid may be, but is not limited to, sulfuric acid and sulfurous acid.

The fertilizer composition may include phosphorus. This means that the fertilizer may include any phosphorus containing compound, acid, or salt thereof. For example, the fertilizer may include a soluble phosphate compound which may be, but is not limited to, a polyphosphate compound and an orthophosphate compound.

Likewise, in one embodiment, the fertilizer composition may include phosphate ions and citric acid, the citric acid chelating any metal ions in the soil in which the plants grow thereby facilitating the transportation of phosphate to the plant roots. It has been experimentally determined that the molar ratio of citric acid concentration to the concentration of the phosphate ions is most preferably about 0.25 to 2.0.

In an alternative embodiment, the fertilizer composition may comprise metal ions, said acid reacting with said any metal ions in said soil in which the plants grow, thereby inhibiting any interference from said any metal ions in said soil in which the plants grow and enhancing delivery of the fertilizer metal ions to the plant roots.

The composition of the present invention may be provided as a dry particulate solid which may be administered to the soil as such or after its dissolution in water. Compositions in accordance with the present invention may also be provided in the form of an aqueous solution either ready for administration or as a concentrate which is diluted prior to use.

The invention further discloses a method for providing a fertilizer to plants, comprising the steps of administering to the plants a fertilizer composition; and shielding the fertilizer from interference with any compounds including metal ions during said administration of the fertilizer to the plant thereby enhancing delivery of the fertilizer to the plants.

The fertilizer may be administered by various means known per se. The fertilizer may be a dry particulate solid or aqueous solution as described above. In one embodiment, the method may comprise the steps of administering to the soil in which the plants grow, a plant soil fertilizer composition; and shielding the fertilizer from interference with any metal ions in the soil in which the plants grow during said administration of the fertilizer to the plant roots, thereby enhancing delivery of the fertilizer to the plant roots.

In an alternative embodiment of the method, the fertilizer composition may be foliarly applied, a steric transport vehicle (STV) reacting with or loosening up the foliar biochemical constituents to thereby facilitate the uptake of the fertilizer.

The fertilizer composition may be shielded by the use of a steric transport vehicle (STV) included in the fertilizer. The STV may use pH, steric blocking, passive cation holdup, and chelation to facilitate the transportation of the fertilizer to the plants.

In one embodiment, said fertilizer is shielded from interference with said any metal ions in said soil by chelating said any metal ions.

The STV is preferably an acid. Acids are preferred that have a network of carboxyl groups working in unison and synergistically share β-hydroxyl and α-hydroxyl groups. These properties foster the hold up or chelation of cations in the soil. To maxime effectiveness, it is further preferred that the STV be transported to the plants for uptake along with the fertilizer constituents, e.g., the water soluble constituents such as phosphates. Thus, acids, particularly organic acids, of small molecular weights are preferred due to their similar migration and holdup characteristics, as that of the fertilizer constituents including, e.g., phosphate compounds. The organic acid may be, but is not limited to, an aliphatic acid or an acid containing at least one carboxyl group.

The organic acid is preferably citric acid. The size to carboxyl site ratio of citric acid, combined with its sharing of α and β carbons makes citric acid particularly effective to chelate metal ions in the soil. Its multiple active sites act in unison to make light common bonds with metals. The β-hydroxyl and α-carboxyl groups on this tricarboxylic acid have been shown to be much more effective to hold up or chelate cations than other acids including simple organic acids, and aromatic acids. The large steric blocking properties of citric acid block out cations and shield the fertilizer constituents, e.g., the phosphates. Citric acid farther uses pH to enhance the solubility of the fertilizer constituents, e.g., phosphate compounds. The size of the citrate compound and its vastly negative sites, along with its solubility, allows it to be transported along with the fertilizer constituents, e.g., water soluble constituents such as phosphates, and further allows it to perform an interference against a cation attack.

Likewise, the acid may be, but is not limited to, phosphoric acid, phosphorous acid, an acid with a molecular weight of not more than 400, a phosphorus-containing acid with a molecular weight of not more than 300, a sulfur-containing acid, oxalic acid, and acetic acid. The sulfur-containing acid may be, but is not limited to, sulfuric acid and sulfurous acid.

The fertilizer composition may include phosphorus. This means that the fertilizer may include any phosphorus containing compound, acid, or salt thereof. For example, the fertilizer may include a soluble phosphate compound which may be, but is not limited to, a polyphosphate compound and an orthophosphate compound.

Likewise, in one embodiment of the method, the fertilizer composition may include phosphate ions and citric acid, the citric acid chelating any metal ions in the soil in which the plants grow thereby facilitating the transportation of phosphate to the plant roots. It has been experimentally determined that the molar ratio of citric acid concentration to the concentration of the phosphate ions is most preferably about 0.25 to 2.0.

In an alternative embodiment of the method, the fertilizer composition may comprise metal ions, said acid reacting with said any metal ions in said soil in which the plants grow, thereby inhibiting any interference from said any metal ions in said soil in which the plants grow and enhancing delivery of the fertilizer metal ions to the plant roots.

In order that the invention described herein may be more fully understood, the following examples are set forth. It should be understood that these examples are for illustrative purposes only and are not to be construed as limiting the scope of the invention in any manner.

EXAMPLE 1

This example illustrates a method of producing a concentrated STV enhanced phosphate solution (production concentrate) of this invention. The solution was prepared in a 1.2 L reactor equipped with a stirrer. The following reactants were added in order at STP: 700 ml of water, 200 g of monoammonium phosphate, 100 g of 2-hydroxy-1,2,3-propane tricarboxylic acid. Stirring was continued until all solids are dissolved. The resulting STV enhanced phosphate solution contained 20 percent monoammonium phosphate by weight (2.49 M available $H_2PO_4^-$).

EXAMPLE 2

This example illustrates a method of producing a dilute STV enhanced phosphate solution (application solution) of this invention. The solution was prepared in a 1.2 L reactor equipped with a stirrer. The following reactants were added in order at STP: 700 ml of water, 20 g of monoammonium phosphate, 10 g of 2-hydroxy-1,2,3-propane tricarboxylic acid. Stirring was continued until all solids are dissolved. The resulting STV enhanced phosphate solution contained 2 percent monoammonium phosphate by weight (0.249 M available $H_2PO_4^-$ ions).

EXAMPLE 3

This example illustrates that phosphate STV of this invention mitigates calcium cation interference with phosphate anion availability. An STV enhanced phosphate solution was prepared as described in Example 2. In addition a control was prepared in a manner identical to Example 2, with the omission of the 2-hydroxy-1,2,3-propane tricarboxylic acid. Further, thirteen additional solutions were prepared in a manner identical to Example 2, with the substitution of other acids in place of the 2-hydroxy-1,2,3-propane tricarboxylic acid. Resulting in the 15 solutions shown in Table 1. Conc. refers to concentration.

TABLE 1

| Solution Sample Number | Phosphate Conc. | Acid Name | Conc. |
|---|---|---|---|
| 1 (control) | .25 M $H_2PO_4^-$ ions | None | 0 M |
| 2 | .25 M $H_2PO_4^-$ ions | 2-hydroxy-1,2,3-propane tricarboxylic acid | .074 M |
| 3 | .25 M $H_2PO_4^-$ ions | Acetic | .074 M |
| 4 | .25 M $H_2PO_4^-$ ions | Boric | .074 M |
| 5 | .25 M $H_2PO_4^-$ ions | Fumaric | .074 M |
| 6 | .25 M $H_2PO_4^-$ ions | Glycolic | .074 M |
| 7 | .25 M $H_2PO_4^-$ ions | Hydrochloric | .074 M |

TABLE 1-continued

| Solution Sample Number | Phosphate Conc. | Acid Name | Conc. |
|---|---|---|---|
| 8 | .25 M $H_2PO_4^-$ ions | Malic | .074 M |
| 9 | .25 M $H_2PO_4^-$ ions | Nitric | .074 M |
| 10 | .25 M $H_2PO_4^-$ ions | Nitrous | .074 M |
| 11 | .25 M $H_2PO_4^-$ ions | Oxalic | .074 M |
| 12 | .25 M $H_2PO_4^-$ ions | Salicylic | .074 M |
| 13 | .25 M $H_2PO_4^-$ ions | Sulfuric | .074 M |
| 14 | .25 M $H_2PO_4^-$ ions | Sulfurous | .074 M |
| 15 | .25 M $H_2PO_4^-$ ions | Tartaric | .074 M |

A highly enriched calcium cation laden soil was simulated by mixing 1 part gibsome powder, and 1 part 50 mesh white quartz. Three hundred grams of the simulated calcium cation laden soil was slowly added to the 14 samples (shown in Table 1) while they were agitated on a shaker bed. The solutions were allowed to react at STP for 23 hours. At which time the mixtures were allowed to settle for one hour, and then the uppermost 100 ml aliquot of the liquid portions were decanted. A heteropoly blue colorimetric method was used to determine the soluble inorganic phosphate concentration of the decanted aliquots. The results are shown in Table 2. These results are averages of duplicated evolutions expressed as a method specific solubility coefficient described by the equation:

$$S_{P\_X} = [P_X]/[P_{E2}]$$

where, $S_{P\_X}$ = The method specific solubility coefficient for soluble inorganic phosphate concentration in the samples shown in Table 1, and treated with calcium as previously described in Example 3.

X = The acid used $[P_X]$ = The soluble inorganic phosphate concentration in decanted acid solution aliquot, as determined a heteropolly blue colorimetric method.

$[P_{E2}]$ = The soluble inorganic phosphate concentration in the solution prepared in Example 2 (no calcium addition), as determined a heteropoly blue colorimetric method.

TABLE 2

| Sample Number | ACID(X) Name | Descriptive Formula | Properties $S_{P\_X}$ | K | pK |
|---|---|---|---|---|---|
| 2 | Citric | $HOC(CH_2COOH)_2COOH$ | 0.615 | 0.00071 | 3.14 |
| 12 | Sulfuric | $H_2SO_4$ | 0.536 | 0.012 | 1.92 |
| 13 | Sulfurous | $H_2SO_3$ | 0.495 | 0.0154 | 1.81 |
| 11 | Oxalic | HOOC—COOH | 0.494 | .0590 | 1.23 |
| 14 | Tartaric | HOOCCHOHCHOHCOOH | 0.446 | 0.00104 | 2.98 |
| 8 | Malic | $HOOCCHOHCH_2COOH$ | 0.398 | 0.00039 | 3.4 |
| 5 | Fumaric | HOOCCH=CHCOOH | 0.343 | 0.00093 | 3.03 |
| 3 | Acetic | $CH_3COOH$ | 0.291 | 1.76E-05 | 4.75 |
| 6 | Glycolic | $HOCH_2COOH$ | 0.287 | 0.000148 | 3.83 |
| 9 | Nitric | $HNO_3$ | 0.271 | | |
| 11 | Salicylic | $HOC_6H_4COOH$ | 0.263 | 3.3E-5 | 4.48 |
| 10 | Nitrous | $HNO_2$ | 0.25 | 0.00046 | 3.37 |
| 7 | Hydrochloric | HCl | 0.238 | | |
| 4 | Boric | $H_3BO_3$ | 0.193 | 7.3E-10 | 9.14 |
| 1 | Control (none) | N/A | 0.079 | N/A | N/A |

The resulting method specific solubility coefficient indicate that citric acid is the most effective STV under these conditions. It also indicates that some inorganic acids such as sulfuric and sulfurous acids can be very effective. Phosphoric and phosphorous acids could not be tested with these other acids, because of the heteropoly blue calorimetric test can be fooled by their soluble phosphor.

EXAMPLE 4

This example illustrates that the 2-hydroxy-1,2,3-propane tricarboxylic acid phosphate STV of this invention provide phosphate in a form which can be utilized by plants. An STV enhanced phosphate solution was prepared as described in Example 2. In addition a control was prepared in a manner identical to Example 2, with the omission of the 2-hydroxy-1,2,3-propane tricarboxylic acid. Further, two additional solutions were prepared in a manner identical to Example 2, with the substitution of other acids in place of the 2-hydroxy-1,2,3-propane tricarboxylic acid. The four solutions are shown in Table 3.

TABLE 3

| Solution Sample Number | Phosphate Concentration | Acid Name | Acid Concentration |
|---|---|---|---|
| 1(control) | .25 M $H_2PO_4^-$ ions | None | 0 M |
| 2 | .25 M $H_2PO_4^-$ ions | 2-hydroxy-1,2,3-propane tricarboxylic acid | .074 M |
| 3 | .25 M $H_2PO_4^-$ ions | phosphoric acid | .074 M |
| 4 | .25 M $H_2PO_4^-$ ions | phosphorous acid | .074 M |

Corn was planted in soil which was deficient in phosphate but adequate in other nutrients. When the corn was approximately 12 inches tall, the four phosphate solutions, shown in Table 3, were foliarly applied. The comparison areas were treated with 0, 5, 10, 15 and 20 gallons of solution per acre.

After one week of exposure, samples of the whorl leaves of the corn were taken. These samples were washed and analyzed for plant phosphate level in the tissue. The results, shown in Table 4, indicate that the increase in phosphate uptake at the 10 gallon treatment level was 4677 ppm with 2-hydroxy-1,2,3-propane tricarboxylic acid phosphate STV, and only 696 ppm with the control. As expected the phosphor acids were also shown to be effective phosphate STVs.

TABLE 4

| Treatment Level | Phosphate Uptake in Corn (in ppm) | | | |
|---|---|---|---|---|
| Gallons of Solution/Acre | Concentration | Enhancement | Concentration | Enhancement |
| | Sample 1 | | Sample 2 | |
| 0 | 3125 | 0 | 3068 | 0 |
| 5 | 3428 | 302 | 4732 | 1664 |
| 10 | 3821 | 696 | 7745 | 4677 |
| 15 | 4172 | 1047 | 8532 | 5464 |
| 20 | 4376 | 1251 | 8957 | 5889 |
| | Sample 3 | | Sample 4 | |
| 0 | 3107 | 0 | 3097 | 0 |
| 5 | 3920 | 813 | 3848 | 751 |
| 10 | 5346 | 2239 | 5625 | 2528 |
| 15 | 7211 | 4104 | 7513 | 4416 |
| 20 | 7538 | 4431 | 7569 | 4472 |

EXAMPLE 5

This example illustrates the effect of the molar ratio of 2-hydroxy-1,2,3-propane tricarboxylic acid on the effectiveness of the phosphate STV. This also illustration that the preferred molar ratio of 2-hydroxy-1,2,3-propane tricarboxylic acid to phosphate ions is 1:4 to 2:1. Nine samples were prepared in a manner similar the method described in Example 2. The samples differ only in the 2-hydroxy-1,2,3-propane tricarboxylic acid to phosphate ions molar ratio. The molar ratios of these samples are detailed in Table 5.

Corn was planted in soil which was deficient in phosphate but adequate in other nutrients. When the corn was approximately 12 inches tall, the eight phosphate solutions, shown in table 5, were foliarly applied. The comparison areas were each treated with 10 gallons per acre, of one of the solution shown in Table 5.

TABLE 5

| Molar Ratio | Phosphate Uptake in Corn (in ppm) | | |
|---|---|---|---|
| (Citric Acid:Phosphate ions) | Moles of Citric Acid/Liter | Moles of Phosphate Ions/Liter | enhancement (ppm) (3068 ppm tare) |
| (1:8) | 0.031 M CitricAcid | .25 M $H_2PO_4^-$ ions | 2575 |
| (1:6) | 0.042 M Citric Acid | .25 M $H_2PO_4^-$ ions | 3073 |
| (1:4) | 0.062 M Citric Acid | .25 M $H_2PO_4^-$ ions | 4529 |
| (1:2) | 0.125 M Citric Acid | .25 M $H_2PO_4^-$ ions | 4732 |
| (1:1) | 0.250 M Citric Acid | .25 M $H_2PO_4^-$ ions | 4821 |
| (2:1) | 0.500 M Citric Acid | .25 M $H_2PO_4^-$ ions | 4976 |
| (4:1) | 1.000 M Citric Acid | .25 M $H_2PO_4^-$ ions | 5487 |
| (8:1) | 2.000 M Citric Acid | .25 M $H_2PO_4^-$ ions | 5264 |

After one week of exposure, samples of the whorl leaves of the corn were taken. These samples were washed and analyzed for plant phosphate level in the tissue. The results, shown in Table 5, indicate that the effective molar ratio is between 1:4 and 2:1. Molar ratios below this range are less effective, and higher molar ratios show diminishing returns.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for providing a fertilizer to plant roots, comprising the steps of:
   a. administering to the soil in which the plants grow, a monoalumonium phosphate plant soil fertilizer; and
   b. shielding the fertilizer, by use of an acid, from interference with any metal ions in the soil in which the plants grow during said administration of the fertilizer to the plant roots, thereby enhancing delivery of the fertilizer to the plant roots; and
   c. where said acid is all inorganic acid or an organic acid containing three or less carboxyl groups.

2. The method of claim 1 wherein said fertilizer is shielded from interference with said any metal ions in said soil by chelating said any metal ions.

3. The method of claim 1 wherein said fertilizer is in combination with said acid reacting with said any metal ions in said soil in which the plants grow, thereby inhibiting any interference from said any metal ions in said soil in which the plants grow and enhancing delivery of the fertilizer to the plant roots.

4. The method of claim 3 wherein said acid is citric acid.

5. The method of claim 4 wherein the fertilizer includes phosphate ions and the molar ratio of citric acid concentration to the concentration of the phosphate ions is about 0.125 to 8.0.

6. The method of claim 5 wherein said molar ratio is about 0.25 to 4.0.

7. The method of claim 5 wherein said molar ratio is about 0.25 to 2.0.

8. The method of claim 3 wherein said acid is selected from the group consisting of phosphoric acids phosphorous acid, a phosphorus-containing acid with a molecular weight of not more than 300, sulfuric acid, sulfurous acid, oxalic acid, and acetic acid.

9. The method of claim 3 wherein said acid is a sulfur-containing acid.

10. A monoammonium phosphate plant fertilizer in combination with an acid wherein the acid is an inorganic acid or an organic acid containing three or less carboxyl groups wherein said acid reacts with any metal ions in the soil in which the plants grow thereby shielding the fertilizer from interference with any metal ions in the soil and enhancing delivery of the fertilizer to the plant roots.

11. The composition of claim 10 wherein the acid is citric acid.

12. The composition of claim 11 wherein the fertilizer includes phosphate ions and the molar ratio of citric acid concentration to the concentration of the phosphate ions is about 0.125 to 8.0.

13. The composition of claim 12 wherein said molar ratio is about 0.25 to 4.0.

14. The composition of claim 12 wherein said molar ratio is about 0.25 to 2.0.

15. The composition of claim 10 wherein said acid is selected from the group consisting of phosphoric acid, phosphorous acid, a phosphorus-containing acid with a molecular weight of not more than 300, sulfuric acid, sulfurous acid, oxalic acid and acetic acid.

16. The composition of claim 10 wherein said acid is a sulfur-containing acid.

17. A method for providing a fertilizer to plant foliage, comprising the step of:
   a. administering to the foliage, a monoammonium phosphate plant fertilizer in combination with an acid, wherein the acid is an inorganic acid or an organic acid with three or less carboxyl groups whereby said acid enhances delivery of the fertilizer to the plant.

18. The method of claim 17 wherein said acid is an organic acid comprising citric acid.

19. The method of claim 18 wherein the fertilizer includes phosphate ions and the molar ratio of citric acid concentration to the concentration of the phosphate ions is about 0.125 to 8.0.

20. The method of claim 19 wherein said molar ratio is about 0.25 to 4.0.

21. The method of claim 19 wherein said molar ratio is about 0.25 to 2.0.

22. The method of claim 17 wherein said acid is selected from the group consisting of phosphoric acid, phosphorous acid, a phosphorus-containing acid with a molecular weight of not more than 300, sulfuric acid, sulfurous acid, oxalic acid, and acetic acid.

23. The method of claim 17 wherein said acid is a sulfur-containing acid.

* * * * *